P. OKEY.
SAW CUTTING MACHINE.
APPLICATION FILED MAR. 5, 1918.

1,296,110.

Patented Mar. 4, 1919.

Witness
A. Sundell

Inventor
Perry Okey

C. C. Shepherd, Attorney.

UNITED STATES PATENT OFFICE.

PERRY OKEY, OF COLUMBUS, OHIO.

SAW-CUTTING MACHINE.

1,296,110.   Specification of Letters Patent.   Patented Mar. 4, 1919.

Application filed March 5, 1918. Serial No. 220,423.

*To all whom it may concern:*

Be it known that I, PERRY OKEY, a citizen of the United States, residing at Columbus, in the county of Franklin and State of Ohio, have invented certain new and useful Improvements in Saw-Cutting Machines, of which the following is a specification.

This invention relates to a machine for cutting saw teeth, particularly for band saws and hack saws.

The main object of my invention resides in a machine embodying a rotary cutter which is provided with a plurality of teeth gradually increasing in depth and also provided with an open space which replaces a plurality of teeth between the shortest and longest tooth.

Further, my invention also resides in combining with the above, means for advancing a saw blade a predetermined distance during the time of travel of the open space over the blade and during the continuous rotation of the cutter. By a structure such as this, the cutting action is automatic and each tooth is properly shaped and also properly spaced.

The preferred embodiment of my invention is shown in the accompanying sheet of drawings in which similar characters of reference designate corresponding parts and in which—

Figure 1:
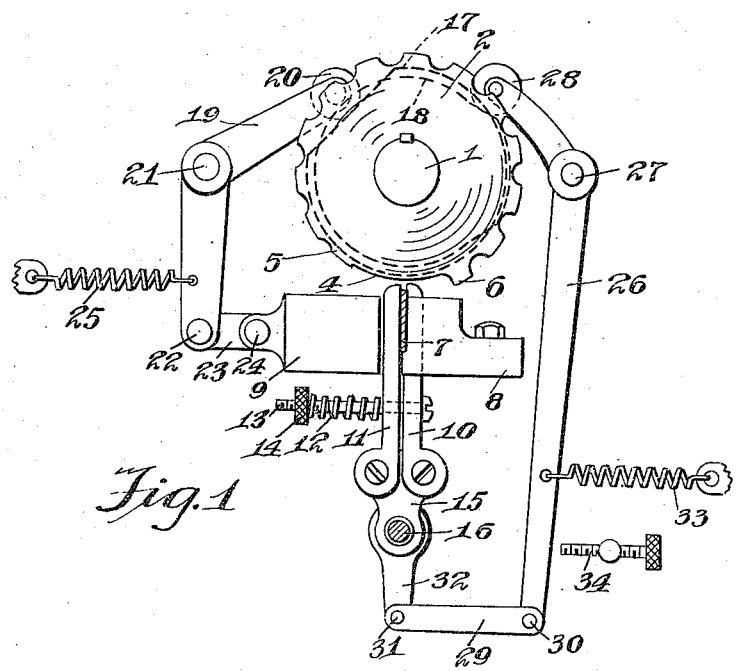
Figure 1 shows an end elevation of my improved structure somewhat diagrammatically.
Figure 2:
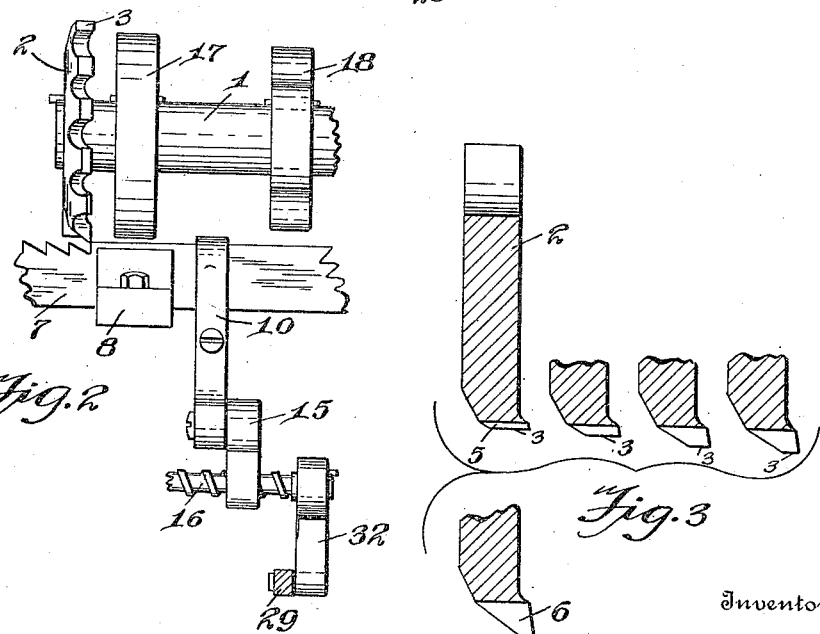
Fig. 2 is a side view of the structure shown in Fig. 1.
Figure 3:
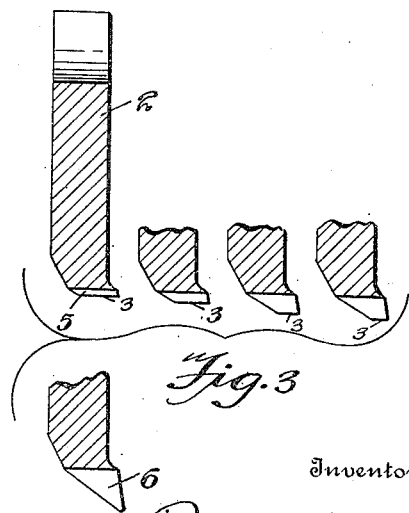
Fig. 3 is a grouped diagrammatical view showing the manner in which the first, a number of intermediate, and the last teeth of the cutter are formed.

In illustrating my invention, I have not deemed it necessary to elaborate upon the base and similar constructions as any one skilled in the art can provide a suitable mounting for the novel structure shown in Figs. 1 and 2. In these figures, the main spindle is designated 1 and to this spindle, there is rigidly mounted a rotary cutter 2. This cutter is provided with a plurality of teeth which gradually increase in depth as is illustrated in Fig. 3 to form a final V-shaped cut. These teeth are preferably cut straight across their tops as is indicated at 3 until their normal depth is reached and are also slightly undersized. Preferably, the last three or four teeth are all of normal depth and full size. I have so formed these teeth with their square tops in order to eliminate undue wear upon so many pointed projections which naturally would be the first to break, dull, or lose their temper. Also, this spindle is so formed that an open space 4 is provided between the shortest tooth 5 and one of the longest teeth 6, this open space being of a length to replace a number of cutting teeth.

The saw blade or strip of metal is designated by the reference numeral 7 and is shown as being suitably gripped between the stationary half 8 and the movable half 9 of a vise. Also, this blade is gripped between a pair of fingers 10 and 11 normally pressed toward each other by means of the spring 12 mounted about the bolt 13 and between the finger 11 and nut 14. This bolt is rigidly engaged by the finger 10 and passes through the finger 11 so that the spring tension normally forces these two fingers toward each other. These two fingers 10 and 11 are in turn pivotally mounted upon a nut 15 having a threaded engagement with feed screw shown at 16. The arrangement is such that this feed screw is partially rotated at predetermined intervals to advance the saw blade.

The spindle 1 is also provided with a pair of cams 17 and 18, the former being designed to operate the movable jaw 9 of the vise and latter being arranged to operate the feed screw 16. A lever 19 carries a roller 20 at one end to coöperate with the cam 17 and this lever is pivotally mounted intermediate its ends as shown at 21. At its opposite ends, this lever is pivotally connected at 22 with a link 23 in turn pivotally connected at 24 to the movable vise jaw 9. A spring 25 normally pulls the lower end of the lever 19 out to bring the roller 20 into bearing engagement with the cam 17. On the opposite side of the structure, there is shown a lever 26 pivotally mounted intermediate its ends at 27 and shown as carrying a roller 28 at one end designed to coöperate with the cam 18. A link 29 is pivotally mounted at 30 to the opposite end of this lever and at 31 to a crank 32 rigidly connected to the feed screw 16. The spring 33 normally pulls the lower end of the lever 26 outwardly to bring the roller 28 into engagement with the cam 18 and an adjustable stop 34 is provided to limit the amount of movement of the lower end of this lever.

The operation of my improved structure is as follows:

The cutter 2 and cams 17 and 18 rotate continuously and are all connected to the spindle 1. When the blank space 4 of the cutter reaches the saw blade, the depression in the cam 17 is in such position that the movable jaw of the vise has been moved out of engagement with the saw blade under the influence of the spring 25. At this point, the roller 28 of the lever 26 begins to ride the hump of the cam 18 which in turn oscillates the crank 32 and feed screw 16. This causes the nut 15 carrying the fingers 10 and 11 to advance slightly to carry the saw blank forward and by the time the proper advance has been made, the roller 20 of the lever 19 is out of the depression of the cam 17 so that the movable vise jaw is again moved into clamping relation with the saw blade. When the roller 28 then leaves the hump of a cam 18 under the influence of a spring 33, the fingers 10 and 11 slide backwardly over the saw blade since they are held in engagement therewith only by means of the tension of the spring 12. The throw of the lever 26 may be regulated by the stop 34, it being understood that the roller 28 is not always in engagement with the cam. Thus, for a very small pitch, the roller 28 does not engage the cam 18 until nearly its highest point is reached whereas, for a coarser pitch, the time of engagement may be earlier as shown in the drawings.

From the foregoing description, it will be apparent that I have provided a machine which embodies a cutter provided with a plurality of teeth of gradually increasing depth and also provided with an open space 4. This open space is so timed to coöperate with other structures to automatically advance the saw blade each time this open space is reached so that a complete tooth is cut at each rotation of the cutter 2. The cutter itself is also shaped to eliminate undue wear, this being true because of the square cuts across the top of the teeth to vary their depths and because of their being slightly under size, so that the final cuts will be produced by the full sized teeth 6 which are also of normal depth. By forming the cutter with slightly undersized teeth, all bur or rough edges are eliminated by the final cut of the full sized teeth. In this manner, the final cut is also very small so that the work it is called upon to perform is also the minimum.

What I claim is:

1. A machine of the character described comprising a rotary cutter provided with a plurality of teeth and an open space, means for holding a metal blade in the path of movement of said teeth, and means for advancing said blade a predetermined distance during the time of travel of said open space over said blade.

2. A machine of the character described comprising a rotary cutter provided with a plurality of teeth gradually increasing in depth and an open space between the first and last tooth, means for holding a metal blade in the path of movement of said teeth, and means for advancing said blade a predetermined distance during the time of travel of said open space over said blade and during the continuous rotation of said cutter.

3. A machine of the character described comprising a rotary cutter provided with a plurality of teeth gradually increasing in depth and an open space between the first and last tooth, a vise for holding a metal blade, feeding means for said blade, and means for releasing said vise and operating said feeding means during the time of travel of said open space over said blade and during the continuous rotation of said cutter.

4. A machine of the character described comprising a spindle, a rotary cutter thereon provided with a plurality of teeth gradually increasing in depth and an open space between the first and last tooth, a vise for holding a metal blade, feeding means for said blade, a pair of cams on said spindle, and means operated by said cams for releasing said vise and operating said feeding means during the time of travel of said open space over said blade and during the continuous rotation of said spindle.

5. In a saw cutting machine, a rotary cutter provided with a plurality of teeth gradually increasing in depth from a small incomplete tooth to a full sized complete V shaped tooth in cross section, said teeth being cut straight across their tops until their normal V shaped depth is reached, said cutter also having an open space replacing a plurality of teeth between the shortest and deepest tooth.

6. In a saw cutting machine, a rotary cutter provided with a plurality of teeth gradually increasing in depth from a small incomplete tooth to a full sized complete V shaped tooth in cross section but slightly undersized, an additional full sized complete V shaped tooth in cross section immediately succeeding the former, said teeth being cut straight across their tops until their normal V shaped depth is reached, and an open space replacing a plurality of teeth between the shortest and the deepest tooth.

In testimony whereof I affix my signature.

PERRY OKEY.

Copies of this patent may be obtained for five cents each, by addressing the "Commissioner of Patents, Washington, D. C."